United States Patent
Castro et al.

(10) Patent No.: US 12,166,177 B2
(45) Date of Patent: Dec. 10, 2024

(54) STABLE ELECTROLYTE BASED ON A FLUORINATED IONIC LIQUID AND ITS USE IN HIGH CURRENT RATE LITHIUM-AIR BATTERIES

(71) Applicant: Toyota Motor Europe, Brussels (BE)

(72) Inventors: Laurent Castro, Brussels (BE); Fanny Bardé, Brussels (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 590 days.

(21) Appl. No.: 17/437,534

(22) PCT Filed: Mar. 11, 2019

(86) PCT No.: PCT/EP2019/056050
§ 371 (c)(1),
(2) Date: Sep. 9, 2021

(87) PCT Pub. No.: WO2020/182292
PCT Pub. Date: Sep. 17, 2020

(65) Prior Publication Data
US 2022/0255134 A1    Aug. 11, 2022

(51) Int. Cl.
H01M 10/0569   (2010.01)
H01M 10/0525   (2010.01)
H01M 10/0568   (2010.01)

(52) U.S. Cl.
CPC ... *H01M 10/0569* (2013.01); *H01M 10/0525* (2013.01); *H01M 10/0568* (2013.01); *H01M 2300/0037* (2013.01)

(58) Field of Classification Search
None
See application file for complete search history.

(56) References Cited

U.S. PATENT DOCUMENTS

| 11,121,422 | B2 * | 9/2021 | Barde | H01M 12/02 |
| 2014/0212772 | A1 | 7/2014 | Nakamoto et al. | |
| 2014/0295262 | A1 | 10/2014 | Nakamoto et al. | |

FOREIGN PATENT DOCUMENTS

| CN | 103843191 A | 6/2014 |
| EP | 2 450 999 A1 | 5/2012 |

(Continued)

OTHER PUBLICATIONS

Marta Alvarez-Tirado, Laurent Castro, Gregorio Guzmán-González, Aurélie Guéguen, Liliana C. Tomé, David Mecerreyes. Design of highly conductive iongel soft solid electrolytes for Li—O2 batteries, Energy Mater 2023;3:300003. (Year: 2023).*

(Continued)

*Primary Examiner* — Carlos Barcena
(74) *Attorney, Agent, or Firm* — Dinsmore & Shohl LLP (57) ABSTRACT

An electrolyte composition, for use in particular in a lithium-air battery, includes
(A) a fluorinated cation of structure $R^1R^2R^3N^+$-(linker$^1$)-O-(linker$^2$)-(FC), wherein $R^1$, $R^2$ and $R^3$ are C1-C6 linear or branched alkyl groups, linkers linker$^1$ and linker$^2$ contain alkylene or oxyalkylene chains and FC is a fluorinated alkyl group;
(B) an anion;
(C) a solvent containing at least one —O—CH$_2$—CH$_2$—O— or —O—CH$_2$—CHMe-O— group, an ε-caprolactone oligomer, or a dialkyl sulfoxide; and
(D) a lithium salt.

18 Claims, 8 Drawing Sheets

(56) References Cited

FOREIGN PATENT DOCUMENTS

EP          2 765 645 A1    8/2014
WO      2018/033200 A1    2/2018

OTHER PUBLICATIONS

Gijs Vanhoutte, Sandra D. Hojniak, Fanny Bardé, Koen Binnemans, Jan Fransaer. Fluorine-functionalized ionic liquids with high oxygen solubility, RSC Adv., 2018, 8, 4525. (Year: 2018).*
H. Nakamoto et al: 11 Ether-functionalized ionic liquid electrolytes for lithium-air batteries 11, Journal of Power Sources, vol. 243, Jun. 10, 2013 (Jun. 10, 2013), pp. 19-23, XP028693482, ISSN: 0378-7753.
Toyota Motor Europe, Notification of Second Office Action, Application No. 201980093346.1, Chinese Patent Office dated Mar. 26, 2024.

* cited by examiner

STABLE ELECTROLYTE BASED ON A FLUORINATED IONIC LIQUID AND ITS USE IN HIGH CURRENT RATE LITHIUM-AIR BATTERIES

CROSS-REFERENCE TO RELATED APPLICATION

This application is a national phase of International Application No. PCT/EP2019/056050 filed on Mar. 11, 2019, the entire contents of which are herein incorporated by reference.

FIELD OF THE DISCLOSURE

The present disclosure relates to an electrolyte composition which can in particular be used in a lithium-air battery. The electrolyte composition contains an ionic liquid comprising a fluorinated cation, an anion, as well as a solvent and a lithium salt.

BACKGROUND TO THE DISCLOSURE

Rechargeable lithium batteries are of considerable interest due to their high energy density and high power. Especially, rechargeable lithium-air batteries have attracted attention for electric vehicles and hybrid vehicles, where high energy density is required. Lithium-air batteries can also be used in various devices (such as computers and telephones), in automotive or stationary applications, and can be assembled in battery packs.

Rechargeable lithium-air batteries use oxygen in the air as a cathode active material. Therefore, compared to conventional lithium rechargeable batteries containing a transition metal oxide (e.g. lithium cobaltate) as a cathode active material, rechargeable lithium-air batteries are able to have larger capacity.

In metal-air batteries, the cathode active material, oxygen, is not contained within the battery. Instead, this material is provided by the surrounding atmosphere. Naturally, such a system allows in principle a very high specific energy (energy provided by the battery per unit weight, typically given in Wh/kg in this technical field). In such batteries, oxygen may be partially reduced to peroxide, or fully reduced to hydroxide or oxide depending on the catalyst, electrolyte, availability of oxygen etc. When the negative electrode (anode) is lithium (Li), lithium peroxide ($Li_2O_2$) or lithium oxide ($Li_2O$) may be formed.

A lithium-air battery comprises in general the following parts:
- metal anode (e.g. containing Li),
- non-aqueous electrolyte (e.g. containing a lithium salt)
- air cathode.

Other parts of the battery device may be present such as: current collectors on the anode and/or cathode side; a separator between the cathode-side electrolyte (catholyte) and anode-side electrolyte (anolyte); a barrier layer between a positive electrode (cathode) and electrolyte, or between a negative electrode (anode) and electrolyte.

WO 2014/133466 discloses an electrolyte for metal air battery composed of: an ionic liquid (IL), a bridging solvent (organic solvent), a fluorinated carbon compounds and a metal salt. In specific embodiments of this disclosure, perfluoroheptane is used to impregnate the carbon electrode before preparation and testing of the Li—$O_2$ cell. Commercial $PYR_{14}$-TFSI is used as ionic liquid in the electrolyte ($PYR_{14}$-TFSI is 1-methyl-1-butyl-pyrrolidinium bis(trifluoromethanesulfone) imide). The fluorinated compound (helping to increase of $O_2$ concentration) is an additive at the surface of the carbon electrode only and therefore its activating affect may not be homogeneous.

US 2017/0222290 discloses a fluorinated chain attached to a solvent forming a fluorinated solvent (2,2-bis(trifluoromethyl)-1,3-dioxolane. No ionic liquid is mentioned in the composition of the electrolyte. The fluorinated solvent being relatively volatile, drying of electrolyte and components leading to a loss of battery performance may occur.

WO 2018/033200 describes the synthesis of fluorinated ionic liquids providing high oxygen solubility.

Among known Li—$O_2$ electrolytes for lithium-air batteries, the following problems need to be addressed:
- maintenance of all physical-chemical properties in the presence of $O_2$ radicals;
- providing high capacity when high current density is applied;
- ensuring that the electrolyte is compatible with a Li metal anode, with effective stripping and plating.

SUMMARY OF THE DISCLOSURE

In order to remedy problems associated with known electrolytes for lithium-air batteries, the present inventors propose a composition as set out in the appended claims. It is considered that this composition provides a Stable Electrolyte for High Current rate Li-Oxygen batteries (SEHCLO). The composition contains a fluorinated ionic liquid with a specific cationic part, an organic solvent of a certain type and amount, and a Li salt.

The experimental results of the inventors indicate that the fluorinated ionic liquid with a specific cationic part used in the electrolyte composition of the disclosure provides:
- High stability against $O_2$ radicals (as shown in CV experiments);
- Low volatility related to the negligible vapor pressure of the ionic liquid, reducing risks of loss of performance through drying;
- No miscibility problems such as encountered when fluorinated organic compounds (such as perfluorocarbons, denoted PFCs) are provided as additional additives to an electrolyte.
- Hydrophobicity: as the oxygen solubility was obtained by using fluorinated cations, the resulting ionic liquids are hydrophobic, which is a potential advantage for the production process (of the electrolyte and or of the battery) and for use of an open battery (air battery).

The lithium-containing electrolyte composition has been observed experimentally to provide:
- Higher discharge capacity at higher current rate;
- Higher power and energy density for the Li—$O_2$ cell;
- Higher cyclability because no electrolyte component is destroyed by contact with oxygen radicals or Li metal;
- No risk of evaporation of electrolyte due to low volatility.

In one aspect, the present disclosure relates to an electrolyte composition comprising:

(A) a cation having the following structural formula (1):

$$R^1R^2R^3N^+\text{-(linker}^1\text{)-O-(linker}^2\text{)-(FC)} \tag{1}$$

wherein:
$R^1$ and $R^2$ are both C1-C6 linear or branched alkyl groups, may be methyl or ethyl,
$R^3$ is a C1-C6 linear or branched alkyl group, may be methyl or ethyl;

the linker[1] consists of: an alkylene chain —(CH$_2$)$_n$— wherein n≥1, or a chain of formula —(CH$_2$—O—CH$_2$—)$_p$ wherein p≥1;

the linker[2] consists of an alkylene chain —(CH$_2$)$_m$— wherein m≥1, or a chain of formula —(CH$_2$—O—CH$_2$—)$_q$ wherein q 1;

the group FC is a fluorinated alkyl group of formula C$_a$H$_b$F$_c$ wherein b+c=2a+1, where c is at least 1 and at most 2a+1 and where a is at least 1 and at most 10;

(B) an anion;

(C) at least 8% and at most 50% by weight, with respect to 100% by weight constituted by all the components of the electrolyte composition, of a solvent, wherein the solvent is one containing at least one —O—CH$_2$—CH$_2$—O— or —O—CH$_2$—CHMe-O— group, an ε-caprolactone oligomer, or a dialkyl sulfoxide;

(D) a lithium salt in an amount of at least 0.1 mol·kg$^{-1}$ and at most 0.9 mol·kg$^{-1}$ with respect to the electrolyte composition as a whole.

In another aspect, the present disclosure relates to a lithium-air battery comprising, in addition to a negative and positive electrode, an electrolyte medium arranged between the negative and positive electrodes and which comprises the electrolyte composition of the disclosure.

DETAILED DESCRIPTION

The present disclosure relates to an electrolyte composition which can in particular be used in a lithium-air battery comprising:
- a negative electrode containing a negative-electrode active material;
- a positive electrode using oxygen as a positive-electrode active material; and
- an electrolyte medium arranged between the negative electrode and the positive electrode;
- wherein the electrolyte medium comprises the electrolyte composition of the disclosure.

In appropriate embodiments, the electrolyte medium should be stable/compatible with both the negative and positive electrodes.

Anode

In a lithium-air battery of the present disclosure, the negative electrode (which may also be referred to as "anode" hereinafter) comprises at least an anode active material (which may also be referred to as "negative electrode active material" hereinafter). As the anode active material, general anode active materials for lithium batteries can be used and the anode active material is not particularly limited. In general, the anode active material is able to store/release a lithium ion (Li$^+$). Specific anode active materials are, for example, metals such as Li, alloys, lithiated oxide, nitrides of the metals, and carbonaceous materials. Combinations of these materials can be used.

Specific anode active materials for rechargeable lithium-air batteries are, for example, a lithium metal, lithium protected anodes, lithium alloys such as a lithium-aluminum alloy, a lithium-tin alloy, a lithium-lead alloy and a lithium-silicon alloy, metal oxides such as a tin oxide, a silicon oxide, a lithium-titanium oxide, a niobium oxide and a tungsten oxide, metal sulfides such as a tin sulfide and titanium sulfide, metal nitrides such as a lithium-cobalt nitride, a lithium-iron nitride and a lithium manganese nitride, and carbonaceous materials such as graphite. Of these, lithium metal may be used.

By "lithium-protected anode", reference is made here for example (but is not limited to) to a "Lithium Protected Electrode" (LPE) as described by Visco et al. (Polyplus). Usually the Li is covered by a solid electrolyte (for example NASICON with formulae LiM$_2$(PO$_4$)$_3$ or LiSiCON related to the γ-Li$_3$PO$_4$ crystal structure). Between the solid electrolyte and the Li metal, there is usually an interlayer (for example consisting of Cu$_3$N/Li$_3$N). In LPE systems, Li metal can be attached directly to one side of solid electrolyte material, or alternatively a small amount of solvent containing a Li salt electrolyte may be added between the solid electrolyte material and the Li metal to ensure Li ionic conductivity. Such materials have been described in, for example, U.S. Pat. Nos. 7,282,295, 7,491,458.

When a metal, alloy or the like in the form of foil or metal is used as the anode active material, it can be used as the anode itself.

The anode is required to contain at least an anode active material; however, as needed, it can contain a binder for fixing the anode active material. The type and usage of the binder are the same as those of the air cathode described hereinafter, so that they will not be described here.

An anode collector may be connected to the anode, which collects current from the anode. The material for the anode collector and the shape of the same are not particularly limited. Examples of the material for the anode collector include stainless steel, copper and nickel. Examples of the form of the anode collector include a foil form, a plate form and a mesh (grid) form.

In the present disclosure, anode materials may be one or more of the following: Li metal, Li alloy such as $Si_xLi_y$, $Sn_xLi_y$, $Sb_xLi_y$, $Sn_xSb_yLi_z$, $C_xLi_y$, $In_xLi_y$, $Al_xLi_y$, or lithiated oxide such as $Li_4Ti_5O_{12}$, $TiNb_2O_7$, $Nb_{16}W_5O_{55}$ or $Nb_{18}W_{16}O_{93}$. Combinations of these materials can be used.

Cathode

In a lithium-air battery of the present disclosure, the positive electrode (which may also be referred to as "cathode" hereinafter) comprises at least a cathode active material (which may also be referred to as "positive electrode active material" hereinafter). As the cathode active material, general cathode active materials for lithium batteries can be used and the cathode active material is not particularly limited.

In the lithium-air battery of the present disclosure, the positive electrode uses oxygen as a positive-electrode active material. Oxygen serving as the positive-electrode active material may be contained in air or oxygen gas.

In the lithium-air battery of the present disclosure, the positive electrode may be a component in which the redox catalyst is supported on a carrier. An example of the carrier is carbon. Examples of carbon include carbon blacks, such as Ketjen Black, acetylene black, channel black, furnace black, lamp black, and thermal black; graphite, such as natural graphite, e.g., scaly graphite, artificial graphite, and expanded graphite; activated carbon from charcoal and coal; carbon foam; carbon fibers obtained by carbonizing synthetic fibers and petroleum pitch-based materials; carbon nanofibers; molecular carbon such as fullerenes; and tubular carbon, such as carbon nanotubes. Modified carbons such as N-doped carbon may also be used.

Positive electrode materials can also be used in a lithium-air battery of the present disclosure based on materials other than carbon. For example, positive electrode materials based on metal foam, stable and conductive metal oxides, or steel, can be used.

In the present disclosure, where carbon is used, it may be a porous material in the form of a powder and may have a high specific surface area of 20 to 2000 $m^2/g$, 60 to 2000 $m^2/g$, or 60 to 1500 $m^2/g$. For example, carbon may be used upon which a treatment is performed by a general method to increase porosity or surface area, followed by another treatment to increase the wettability. Examples of the commercial carbon products which can be used in the present disclosure include the KS series, SFG series, Super P series and Super S series available from TIMCAL Ltd., activated carbon products available from Norit, Black Pearl and AB-Vulcan 72 available from Cabot, and KB-ECP and KB-ECP600JD available from Nouryon. Other examples of commercially available carbon include the WAC powder series available from Xiamen All Carbon Corporation, PW15-type, J-type and S-type Activated Carbons available from Kureha, and Maxsorb MSP-15 available from Kansai Netsu Kagaku.

Examples of the method for increasing the porosity, surface area and wettability of the carbon include physical activation or chemical activation. The chemical activation method includes, for example, immersing the carbon material in a strong alkaline aqueous solution (potassium hydroxide solution for example), in an acid solution (nitric acid or phosphoric acid for example) or in a salt (zinc chloride for example). This treatment can be followed (but not necessarily) by a calcination step at relatively low temperature (450° C. to 900° C. for example).

In addition, the carbon may have pores having a pore diameter of 5 nm or more, or 20 nm or more. The specific surface area of the carbon and the pores size can be measured by the BET method or the BJH method, for example. Furthermore, in general, the carbon may have an average particle diameter (primary particle diameter) of 8 to 350 nm, or 30 to 50 nm. The average primary particle diameter of the carbon can be measured by TEM.

The carbon used in the present disclosure may show any one of the above-mentioned ranges for specific surface area, pore diameter or particle diameter. Carbon in the framework of the disclosure may include carbon showing a range for just one of these types of physical feature, or carbon showing ranges for two of the features, or carbon showing ranges for each of the three features of specific surface area, pore diameter or particle diameter.

Among forms of carbon that can be used in the present disclosure are: Super P® Li (Timcal) showing a particle size of 40 nm and a specific surface area (determined by the Brunauer Emmet & Teller method) of 62 $m^2/g$; Black Pearl® 2000 (from Cabot Corporation) showing a particle size of 12 nm and a Specific Surface Area (determined by the Brunauer Emmet & Teller method) of 1487 $m^2/g$; Ketjen Black® EC-600JD (from AzkoNobel) showing a specific surface area (determined by the Brunauer Emmet & Teller method) of 1400 $m^2/g$.

In lithium-air batteries, a catalyst is commonly added to the cathode because it is believed or demonstrated that it helps the $Li_2O_x$ decomposition during the charging/oxidation process. In one embodiment therefore, the positive electrode has a catalyst content of 0.01% to 60% by weight, 55% by weight or less, or 0.01% to 50% by weight with respect to the total weight of the positive electrode. A quantity of catalyst may be from 0.1% to 30% by weight, 1% to 25% by weight, 2% to 20% by weight, or 3% to 15% by weight with respect to the total weight of the positive electrode. At a catalyst content of 0.01% by weight or more, the effect of the catalyst is sufficiently exhibited. At a catalyst content of 60% by weight or more, the proportions of other components such as a conductive material and a binder incorporated in the positive electrode tend to be too low, thus giving rise to possible reductions in conductivity and mechanical strength.

Types of catalyst material that can be used in a lithium-air battery according to the present disclosure include: transition metal oxides such as $MnO_2$ in various forms, α-type, $Co_3O_4$, $Fe_2O_3$, $CuO$, $LiCoO_2$, mixed transition metal oxides such as $NiFe_2O_4$, $CoFe_2O_4$, $MnFe_2O_4$, Co phthalocyanine ($C_{36}H_{16}CoN_8$), metals (Mn, Co, Ru, Pt, Ag, CoMn, Au).

This catalyst may be dispersed/deposited onto the carbon to increase its efficiency. Air cathodes prepared using carbon on which catalyst is dispersed/deposited may also to be used in combination with the electrolyte of the present disclosure.

In the lithium-air battery of the present disclosure, the positive electrode may contain a conductive material, in addition to the carbon and non-carbon materials discussed above. Examples of such further conductive materials include conductive fibers such as metal fibers; metal powders, such as silver, nickel, aluminum powders; and organic conductive materials such as polyphenylene derivatives. These may be used separately or in combination as a mixture.

Moreover, the positive electrode may contain lithium oxide or lithium peroxide.

In the lithium-air battery of the present disclosure, the positive electrode may contain a binder. The binder is not particularly limited. The binder may be composed of a thermoplastic resin or a thermosetting resin. Examples thereof include polyethylene, polypropylene, polytetrafluoroethylene (PTFE), styrene-butadiene rubber, tetrafluoroethylene-hexafluoropropylene copolymers, tetrafluoroethylene-hexafluoropropylene copolymers (FEP), tetrafluoroethylene-perfluoroalkyl vinyl ether copolymers (PFA), vinylidene fluoride-hexafluoropropylene copolymers, vinylidene fluoride-chlorotrifluoroethylene copolymers, ethylene-tetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene copolymers (ECTFE), vinylidene fluoride-hexafluoropropylene-tetrafluoroethylene copolymers, vinylidene fluoride-perfluoromethyl vinyl ether-tetrafluoroethylene copolymers, and ethylene-acrylic acid copolymers. Copolymers having sulfonate group-terminated perfluorovinyl ether groups attached to a poly(tetrafluoroethylene) backbone, such as those commonly referred to as Nafion, may also be envisaged as polymer binder materials in the present disclosure. These materials may be used separately or in combination as a mixture.

In general, in advantageous embodiments of the present disclosure, an air cathode collector is connected to the air cathode, which collects current from the air cathode. The material for the air cathode collector and the shape of the same are not particularly limited. Examples of the material for the air cathode collector include stainless steel, aluminum, iron, nickel, titanium and carbon. Examples of the form of the air cathode collector include a foil form, a plate form, a mesh (grid) form and a fibrous form. The air cathode collector may have a porous structure such as a mesh form since the collector having a porous structure has excellent efficiency of oxygen supply to the air cathode.

In some embodiments, the air electrode (air cathode) further comprises hydrophobic hollow fibers. A hydrophobic fiber tends to generate a space between itself and the electrolyte. These spaces facilitate $O_2$ diffusion in the air electrode, enabling a thicker electrode to be used. Typically carbon-based air electrodes are 0.5 to 0.7 mm thick. Addition of hydrophobic fibers allows use of electrodes that are at least 1 mm thick. Suitable fibers include DuPont HOLLOFIL® (100% polyester fiber with one more holes in the core), goose down (very small, extremely light down found next to the skin of geese), PTFE fiber, and woven hollow fiber cloth, among others. KETJENBLACK® carbon can also be coated on these fibers.

In the present disclosure, cathode materials may be one or more of the following: carbon (e.g. Super C65, Ketjen black, Vulcan XC-72 CNT), $MnO_2$, $RuO_2$, $LaFeO_3$, $NiCo_2O_4$, Au, Ir, graphene, reduced graphene oxide (rGO). Combinations of these materials can be used.

Electrolyte

In the electrolyte composition of the present disclosure, fluorinated cation (A) and anion (B) constitute an ionic liquid. Anion (B) may be fluorinated or not. The preparation of (A)-(B) combinations (and other molecules) has been described in WO 2018/033200.

In the electrolyte composition of the present disclosure, component (A) is a cation having the following structural formula (1):

$$R^1R^2R^3N^+\text{-(linker}^1\text{)-O-(linker}^2\text{)-(FC)} \quad (1)$$

wherein:
$R^1$ and $R^2$ are both C1-C6 linear or branched alkyl groups, may be methyl or ethyl,
$R^3$ is a C1-C6 linear or branched alkyl group, may be methyl or ethyl;
the linker$^1$ consists of: an alkylene chain —$(CH_2)_n$— wherein n≥1, or a chain of formula —$(CH_2$—O—$CH_2$—$)_p$ wherein p≥1;
the linker$^2$ consists of an alkylene chain —$(CH_2)_m$— wherein m≥1, or a chain of formula —$(CH_2$—O—$CH_2$—$)_q$ wherein q≥1;
the group FC is a fluorinated alkyl group of formula $C_aH_bF_c$ wherein b+c=2a+1, where c is at least 1 and at most 2a+1 and where a is at least 1 and at most 10;
In linker$^1$:
n is at most 10, or at most 2;
p is at most 5, or at most 1;
and in linker$^2$:
m is at most 10, or at most 1;
q is at most 5, or at most 1.

In embodiments, the linker group linker$^1$ is ethylene —$CH_2$—$CH_2$— and/or the linker group linker$^2$ is methylene —$CH_2$—. Additionally, advantageously, c>b in the fluorinated alkyl group FC, c>2b, c>3b, or c>5b.

In a embodiment, the linker group linker$^1$ is ethylene —$CH_2$—$CH_2$—, the linker group linker$^2$ is methylene —$CH_2$—, $R^1$ and $R^2$ are ethyl and $R^3$ is methyl, and FC is $CF_3$.

In the electrolyte composition of the present disclosure, anion (B) may be an anion having one of the following structures: $C_nF_{2n+1}$—$SO_2$—N—$SO_2$—$C_mF_{2m+1}^-$, $C_nF_{2n+1}COO^-$ and/or $C_nF_{2n+1}SO_3^-$, wherein n and m are at least 1 and at most 10; $PF_6^-$, $BF_4^-$. Anion (B) may alternatively be selected from the group consisting of: dicyanamide; halides such as chloride or bromide; and bis(pentafluoroethyl)trifluorophosphate.

In a embodiment, the fluorinated anion (B) may be $F_3C$—$SO_2$—$(N^-)$—$SO_2$—$CF_3$, i.e. bis(trifluoromethanesulfonyl)imide (also called TFSI). An embodiment of lithium salt (C) may be Li-TFSI, so that here anions added in components (B) and (C) of compositions of the present disclosure contain $(F_3C$—$SO_2)_2$—$(N^-)$ (TFSI).

A combination of fluorinated cation (A) and fluorinated anion (B) in the present disclosure may be N,N-diethyl-N-methyl-N-((trifluoroethoxy)ethyl)ammonium bis(trifluoromethanesulfonyl)imide:

In the present disclosure, the cation—anion couple constituted by (A) and (B), functions as an ionic liquid. It is also possible to include within the electrolyte composition of the present disclosure, known ionic liquids. The cation part of such known ionic liquids may in particular be:
imidazolium cations with C1-C4 alkyl groups on positions 1 and 3 or 1, 2 and 3 of the imidazolium ring;

pyrrolidinium cations with two alkyl groups on position 1 (the N atom) of the pyrrolidinium ring;

pyridinium cations with C1-C4 alkyl groups on positions 1 and 3 of the pyridinium ring;

guanidium;

trihexyl(tetradecyl)phosphonium;

The anion part of such known ionic liquids may in particular be:

$C_nF_{2n+1}$—$SO_2$—N—$SO_2$—$C_m$—$F_{2m+1}^-$, $C_nF_{2n+1}COO^-$ and/or $C_nF_{2n+1}SO_3^-$, wherein n and m are at least 1 and at most 10;

$PF_6^-$;

$BF_4^-$;

dicyanamide;

halides (chloride, bromide);

bis(pentafluoroethyl)trifluorophosphate;

Examples of commercially available ionic liquids with fluorinated anions that may be blended into the electrolyte composition of the present disclosure include: [BMPyrr][Tf$_2$N], [DEME][Tf$_2$N] and [PP13][PF$_6$]. These ionic liquids do not have fluorinated cations.

The BMPyrr cation has the following structure:

[BMPyrr]

The NTf$_2$ (or Tf$_2$N) anion has the following structure:

The DEME cation has the following structure:

PP13 (N-methyl-N-propyl piperidinium) has the following structure:

In the electrolyte composition of the present disclosure, a solvent (C) is present at an amount of at least 8% and at most 50% by weight, with respect to 100% by weight constituted by all the components of the electrolyte composition, at least 13% and at most 36%, or at least 15% and at most 25%. The (aprotic) solvent is:

a solvent containing at least one —O—$CH_2$—$CH_2$—O— or —O—$CH_2$—CHMe-O— group;

an ε-caprolactone oligomer; or a dialkyl sulfoxide.

In embodiments, the solvent containing at least one —O—$CH_2$—$CH_2$—O— or —O—$CH_2$—CHMe-O— group may show end-capping —O-Me groups.

In embodiments, the solvent containing at least one —O—$CH_2$—$CH_2$—O— or —O—$CH_2$—CHMe-O— group may have a molecular weight Mw of not more than 225 g·mol$^{-1}$.

In embodiments, the solvent containing at least one —O—$CH_2$—$CH_2$—O— or —O—$CH_2$—CHMe-O— group may be selected from the group consisting of: dimethoxyethane (DME), diethylene glycol dimethyl ether (diglyme), triethylene glycol dimethyl ether (triglyme, TEGDME), and tetraethylene glycol dimethyl ether (tetraglyme).

In an embodiment, the solvent containing at least one —O—$CH_2$—$CH_2$—O— or —O—$CH_2$—CHMe-O— group may be dimethoxyethane (DME).

In the electrolyte composition of the present disclosure, a lithium salt (D) is present in an amount of at least 0.1 mol·kg$^{-1}$ and at most 0.9 mol·kg$^{-1}$ with respect to the electrolyte composition as a whole. In embodiments, the lithium salt (D) may be present in an amount of at least 0.25 mol·kg$^{-1}$ and at most 0.50 mol·kg$^{-1}$ with respect to the electrolyte composition as a whole, or at least 0.27 mol·kg$^{-1}$ and at most 0.40 mol·kg$^{-1}$.

In embodiments, the lithium salt (D) may be selected from the group consisting of: LiTFSI, LiPF$_6$, LiBF$_4$, LiClO$_4$, LiFSI, LiBOB LiAsF$_6$, LiFAP, LiTriflate, LiDMSI, LiHPSI, LiBETI, LiDFOB, LiBFMB, LiBison, LiDCTA, LiTDI, LiPDI.

In an embodiment, the lithium salt (D) may be LiTFSI.

Separator

In the rechargeable lithium-air battery of the present disclosure, a separator may advantageously be provided between the air cathode and the anode for complete electrical insulation between these electrodes. The separator is not particularly limited as long as it is able to electrically insulate the air cathode and the anode from each other and has a structure that allows the electrolyte to be present between the air cathode and the anode.

Examples of the separator include porous films and nonwoven fabrics comprising polyethylene, polypropylene, cellulose, polyvinylidene fluoride, glass ceramics, etc. Of these, a separator of glass ceramics may be used.

Battery Case

As the battery case for housing the rechargeable lithium-air battery, general battery cases for rechargeable lithium-air batteries can be used. The shape of the battery case is not particularly limited as long as it can hold the above-mentioned air cathode, anode and electrolyte. Specific examples of the shape of the battery case include a coin shape, a flat plate shape, a cylindrical shape and a laminate shape. It is possible for the battery of the present disclosure to be completely encased in an oxygen-permeable membrane, advantageously one which shows selectivity for oxygen diffusion over that of water.

Use of the Battery of the Disclosure

The rechargeable lithium-air battery of the disclosure can discharge when an active material, which is oxygen, is supplied to the air cathode. Examples of oxygen supply source include the air, dried air, a mixture of inert gas ($N_2$, Ar . . . ) with oxygen or oxygen gas, and may be oxygen gas. The pressure of the supplied air, dried air or oxygen gas is not particularly limited and can be appropriately determined.

The lithium-air battery of the present disclosure may be used as a primary battery or a rechargeable secondary battery.

The lithium-air battery of the present disclosure may, for example, be put to practical use in a process wherein the battery is cycled between certain limits defined by initial and final voltage, or initial and final capacity or specific capacity. For example, one process for using the lithium-air battery of the present disclosure may consist of a process wherein:
 (a) the lithium-air battery is provided in a fully charged state;
 (b) the lithium-air battery is subjected to discharge until the specific capacity reaches a value X;
 (c) the lithium-air battery is recharged;
 (d) steps (b) and (c) are repeated.

The specific capacity value X selected may vary widely and, for example, be situated in the range of 0.1 to 20 $mAh \cdot cm^{-2}$. The specific capacity of a lithium-air battery may be determined by discharging up until 2 V. It may be appropriate during operation of the battery to cycle the battery within limits that do not go to full discharge or charge. It may be advantageous to cycle the battery between 10% to 90% of its specific capacity (determined in step(b)), 20% to 80%, or 20% to 70%. Cycling may also be carried out between certain limits of initial or maximum theoretical discharge capacity. Capacity-limited cycling may enable the cell to survive longer, and it may thus be appropriate to limit the cycling capacity to around 30% of the full discharge capacity.

It is possible to provide as a product, a battery whose air cathode contains added $Li_2O_2$. Such a battery would typically be charged before use.

The lithium-air battery of the present disclosure can be used as a rechargeable lithium battery for electric vehicles and hybrid vehicles, or in various devices (such as computers and telephones), in automotive or stationary applications, and can be assembled in battery packs.

Any combination of the above described elements in all possible variations thereof is encompassed by the disclosure unless otherwise indicated herein or otherwise clearly contradicted by context. Thus, all features and embodiments described herein are to be construed as being applicable in combination with one another, in embodiments.

EXAMPLES

Synthesis for Comparative Example 1, Comparative Example 2, Comparative Example 3, Example 1, Example 2, Example 3

All steps of the synthesis were carried out inside an argon filled glove box (MBRAUN) with oxygen and water concentrations below 1 ppm in order to avoid any water contamination.

Raw Materials

For preparation of Comparative Example 1 and Comparative Example 2, diethylmethyl(2-methoxyethyl)ammonium, called DEME-TFSI, was provided by Sigma-Aldrich, with a purity>98.5% with water concentration as measured by Karl Fischer Coulometry of 20 ppm.

For the preparation of Comparative Example 3, Example 1, Example 2 and Example 3, N,N-diethyl-N-methyl-N-((trifluoroethoxy)ethyl)ammonium bis(trifluoromethanesulfonyl)imide, called FIL-TFSI, was specially synthesized by Solvionic (France) on the basis of the synthesis given in WO 2018/033200 and in Vanhoutte et al., *RSC Adv.*, 2018, 8, 4525-4530 DOI: 10.1039/C7RA13403G. No impurities were detected by NMR of $^1H$, $^{13}C$, and $^{19}F$, and a water concentration measured by Karl Fischer Coulometry of 20 ppm.

For preparation of Comparative Example 2, Example 1, Example 2 and Example 3,1,2-dimethoxyethane (DME), with a purity of 99.5% was provided by BASF with water concentration measured by Karl Fischer Coulometry of 100 ppm.

For Comparative Example 1, Comparative Example 2, Comparative Example 3, Example 1, Example 2 and Example 3, bis(trifluoromethane)sulfonimide lithium salt, called LiTFSI, was provided by Sigma-Aldrich, with a purity of 99.95% and was firstly dried for 12 h at 80° C. under vacuum ($<10^{-2}$ mbar).

Synthesis of SEHCLO

The synthesis of SEHCLO electrolytes (Stable Electrolyte for High Current rate Li-Oxygen battery=SEHCLO) has two steps:

As a first step LiTFSI was dissolved:
 in DEME-TFSI forming Solution (1) with appropriate amount to get a concentration of 0.35 $mol \cdot kg^{-1}$,
 in FIL-TFSI forming Solution (2) with appropriate amount to get a concentration of 0.35 $mol \cdot kg^{-1}$,
 in DME forming Solution (3) with appropriate amount to get a concentration of 0.35 $mol \cdot kg^{-1}$ Solution (1), Solution (2) and Solution (3) were maintained under magnetic stirring for 12 h.

As a second step, for Comparative Example 2, Solution (1) and Solution (3) were put together according to the quantities reported in Table 2 and then mixed under magnetic stirring for 12 h.

As a second step, for Example 1, Example 2 and Example 3, Solution (2) and Solution (3) were put together according to the quantities reported on Table 2 and then mixed under magnetic stirring for 12 h.

TABLE 1

Nominative composition of different electrolytes

| | Cationic part of ionic liquid | Anionic part of ionic liquid | Anionic part of Li salt | Solvent |
|---|---|---|---|---|
| Comparative Example 1 | DEME | TFSI | TFSI | — |
| Comparative Example 2 | DEME | TFSI | TFSI | DME |
| Comparative Example 3 | FIL | TFSI | TFSI | — |
| Example 1 | FIL | TFSI | TFSI | DME |
| Example 2 | FIL | TFSI | TFSI | DME |
| Example 3 | FIL | TFSI | TFSI | DME |

TABLE 2

Quantitative composition (in grams) of different electrolytes

|  | Cationic part and anionic parts of ionic liquid | Solvent (C) | Li salt (D) |
| --- | --- | --- | --- |
| Comparative Example 1 | 5.013 | 0 | 0.503 |
| Comparative Example 2 | 1.835 | 0.184 | 0.202 |
| Comparative Example 3 | 4.900 | 0 | 0.498 |
| Example 1 | 12.760 | 1.318 | 1.419 |
| Example 2 | 12.000 | 2.725 | 1.473 |
| Example 3 | 4.458 | 4.459 | 0.898 |

Analysis Methods: Determination of Reversibility of $O_2$ Oxido-Reduction Reaction in Lithium-Free Solution In order to evaluate the reversibility of the $O_2$ oxido-reduction reaction without any perturbation of Li activity on the electrochemical signal, two solutions, Solution (4) and Solution (5) without Li salt were prepared.

Synthesis of Solution (4): Li-Free Equivalent Solution of Comparative Example 2 Electrolyte Comparative Example (2)=Solution (4)+xM LiTFSI Inside an argon-filled glove box (MBRAUN) with oxygen and water concentrations below 1 ppm in order to avoid any water contamination DEME-TFSI and DME were put together in a weight ratio of (90:10) and then mixed under magnetic stirring for 12 h.

Synthesis of Solution (5): Li-Free Equivalent Solution of Example 2 Electrolyte Example (2)=Solution (5)+xM LiTFSI Inside an argon-filled glove box (MBRAUN) with oxygen and water concentrations below 1 ppm in order to avoid any water contamination, FIL-TFSI and DME were put together in a weight ratio of (90:10) and then mixed under magnetic stirring for 12 h.

Figure 1:
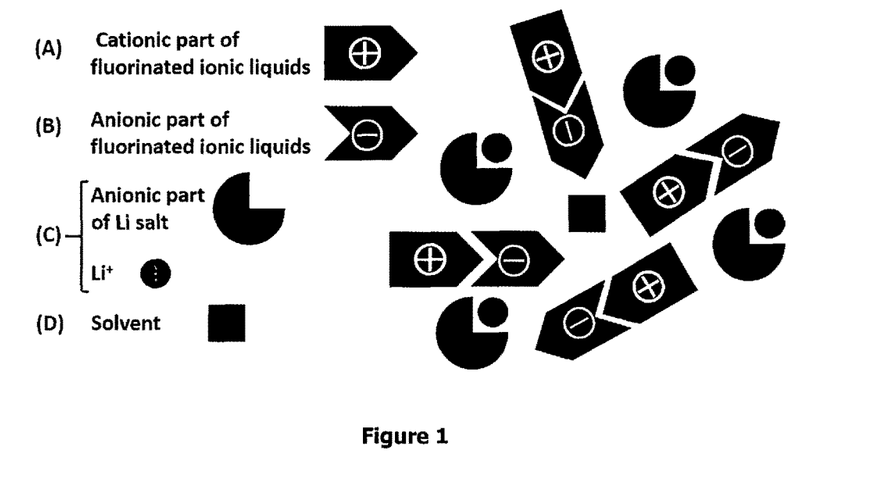
FIG. 1 shows a general scheme for the composition of a Stable Electrolyte for High Current rate Li-Oxygen battery (SEHCLO) of the present disclosure.
Figure 2:
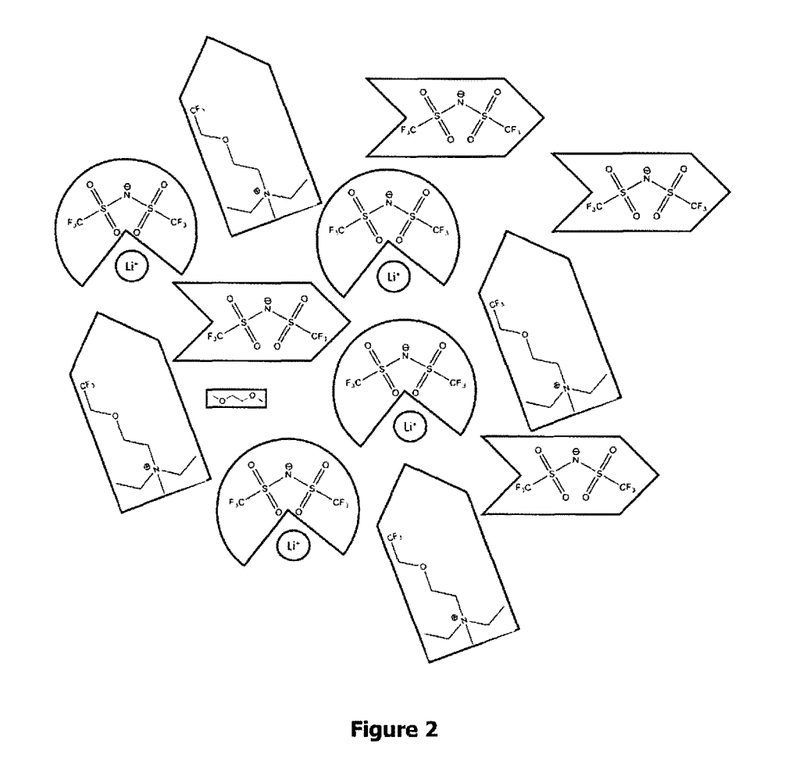
FIG. 2 shows a specific type of stable electrolyte (as used for Example 3).
Figure 3:
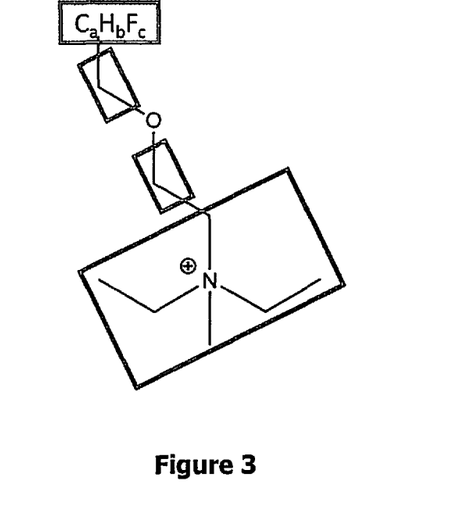
FIG. 3 shows the general formula of the cationic part of a fluorinated ionic liquid.
Figure 4:
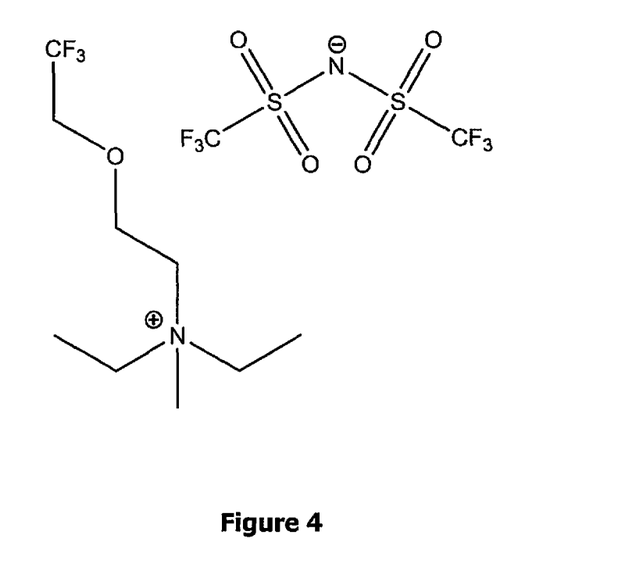
FIG. 4 shows the structure of N,N-diethyl-N-methyl-N-((trifluoroethoxy)ethyl)ammonium bisarifluoromethanesulfonyl)imide, called FIL-TFSI.
Figure 5:
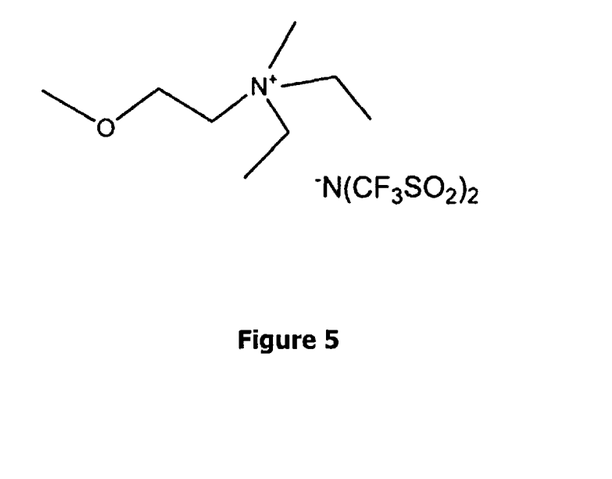
FIG. 5 shows the structure of diethylmethyl(2-methoxyethyl)ammonium, called DEME.
Figure 6:
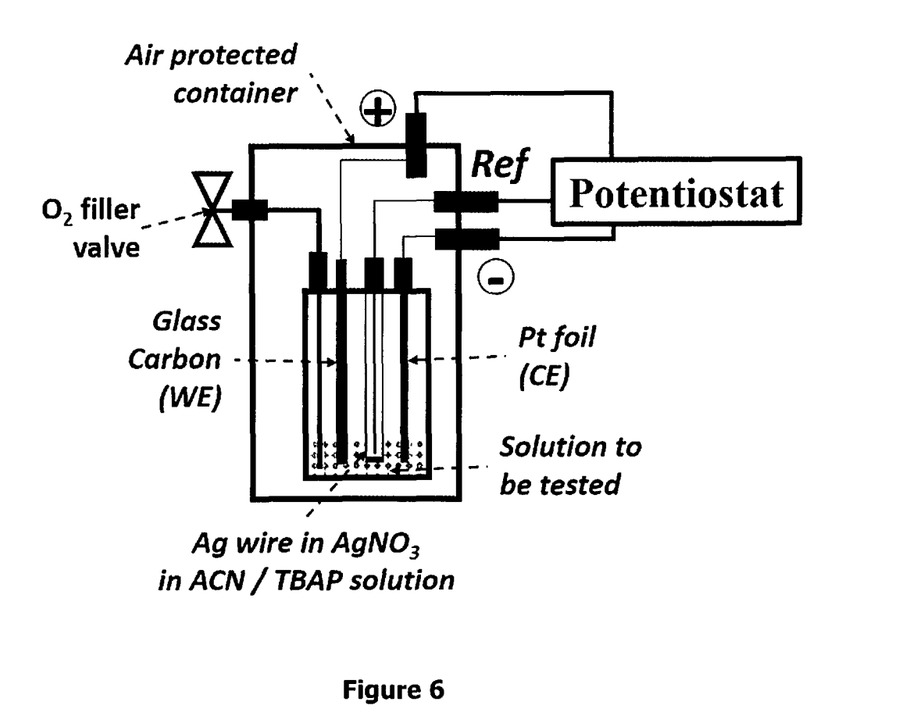
FIG. 6 shows a schematic diagram representing a cyclic voltammetry experimental set-up that may be used for the determination of reversibility of the O$_2$ redox reaction in lithium-free solution avoiding any H$_2$O contamination during O$_2$ filling

Cyclic voltammetry experiments were performed using a three-electrode set-up hermetically enclosed in a glass vessel in order to avoid any water entrance during oxygen filling (cf. FIG. 6). This cell was built, filled with Solution (4) or Solution (5) and closed inside the argon-filled glove box. Then the cell was purged outside the glove box with pure oxygen having the gas bubbling in the solution. Oxygen gas (99.999%, Praxair) was used. The gas was bubbled through the solution via a Teflon tube for 30 minutes.

All electrochemical measurements were performed using VMP multichannel potentiostats/galvanostats (Biologic, France) controlled with EC lab software. The working electrodes used were: (1) a glassy carbon macro electrode ($\phi$=3 mm). The real reference electrode was a silver wire 99.98%, Chempur) in a glass tube filled with an acetonitrile solution of 0.01 M silver nitrate and 0.1 M tetrabutylammonium perchlorate, which was separated from the electrolyte by a glass frit. The reference tube was assembled at least 30 minutes prior to the electrochemical measurement. A platinum foil was used as counter electrode. The electrochemical cell was placed in an temperature chamber (CTS) at 25.0±0.2° C. The area of oxidation part (A2) is compared with the area of reduction part in order to obtain the reversibility of the electrochemical reaction: $O_2 + e^- \rightarrow O_2^-$.

Figure 8:
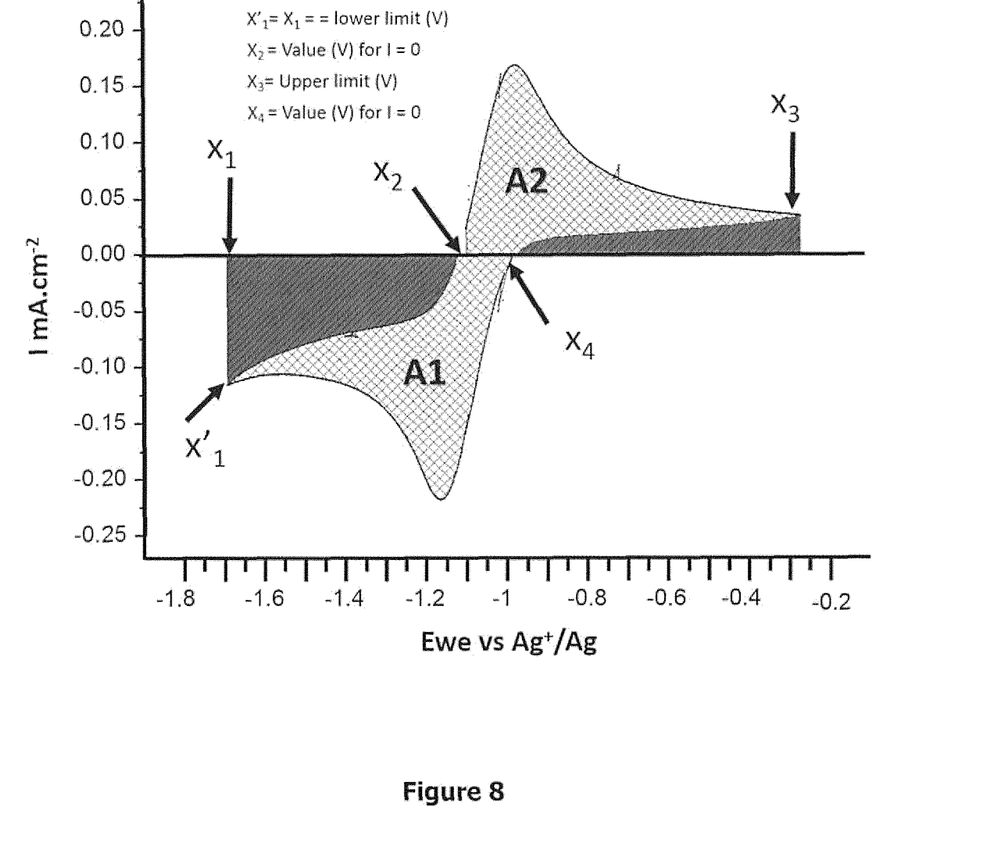
FIG. 8 shows cyclic voltammetry results obtained in Li-free solution of FIL+solvent (FIL refers here to the specific fluorinated cation N,N-diethyl-N-methyl-N-((trifluoroethoxy)ethyl)ammonium).

As regards the calculation of the efficiency of $O_2$ reduction/oxidation, this is based on the cyclic voltammetry curve areas A1 and A2 (centre bottom left and centre top right, respectively) as shown in FIG. 8, calculated as follows:

$$\frac{\int_{x2}^{x3} I(V)dV - \int_{x3}^{x4} I(V)dV}{\int_{x4}^{x'1} I(V)dV - \int_{x1}^{x2} I(V)dV} = \frac{A2}{A1}$$

The efficiency of the $O_2$ reduction/oxidation based on based on cyclic voltammetry (CV) experiments is as follows:

TABLE 3

Efficiency of the $O_2$ reduction/oxidation based on based on CV experiments (10 mV·s$^{-1}$)

|  | Efficiency of the reaction |
| --- | --- |
| Solution (4) (Li free) DEME-TFSI + DME 10% | 78.2% |
| Solution (5) (Li free) FIL + DME 10% | 99.4% |

The results from FIG. 8 and above Table 3 show the higher stability of FIL+DME as compared to DEME-TFSI+DME. It is believed that due to high stability shown by an efficiency of 100% during oxido-reduction of $O_2$, the electrolyte from the present disclosure is able to keep all its physical-chemical properties in the presence of $O_2$ radicals.

Determination of Rate Performances of Li—$O_2$ Cells

Preparation of carbon electrodes: All steps of the preparation were carried out inside a glove box in order to avoid any water contamination. Carbon (Ketjen black, AkzoNobel, US) and binder (Lithion, Ion Power, US) in a weight ratio of (80:20) were mixed together with anhydrous propanol as solvent (mass concentration 10 g·l$^{-1}$). Then this ink was drop-casted on 1 cm$^2$ disk of carbon paper (GDL H1410 Quintec, Germany) with a loading range of 1 mg·cm$^2$. Electrodes (carbon paper coated) were then dried under vacuum for 12 h at 120° C. before being used in Li—$O_2$ cells.

Figure 7:
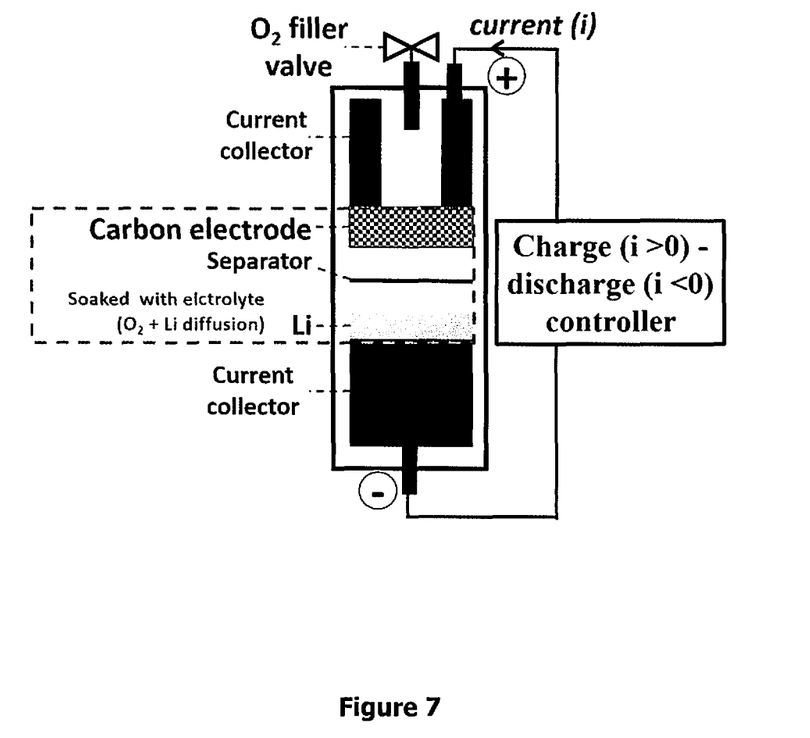
FIG. 7 shows, in a schematic view, Li—O$_2$ cells used for determination of rate performances of Li—O$_2$ cells.

Preparation of Li—$O_2$ cells: All steps of the preparation were carried out inside an argon-filled glove box with oxygen and water concentrations below 1 ppm in order to avoid any water contamination. Cells were prepared using homemade equipment based on an open swage-lock core cell ($\phi$12 mm) placed in closed Teflon balloon (FIG. 7). Li disk ($\phi$8 mm) (Rookwood, US) was placed on a stainless steel cylinder (AISI 316) used as negative current collector. Glass fiber separators (Whatmann, BE) ($\phi$12 mm) was then placed at the surface of the lithium and soaked with 200 μl of electrolyte. Carbon electrodes were then placed coated side facing separator. Open stainless steel cylinder (AISI 316) was then placed in order to allow oxygen filling inside cells. Cells were then placed on homemade Teflon holder to ensure the verticality of the Li—$O_2$ cell at the bottom of the Teflon balloon. The $O_2$ gas was then filled through a Teflon balloon for 30 minutes.

Test of Li—$O_2$ cells: The cells filled with $O_2$ were kept at the operating temperature (25° C.) in the temperature chamber for 3 h prior to the electrochemical tests. VMP multichannel potentiostats/galvanostats (Biologic, France) controlled with EC lab software was used to apply different current rate from 0.5 10⁻³ mA·cm⁻² to 0.25 mA·cm⁻² for 15 min following the potential until potential reached the value of 2 V.

Figure 9:
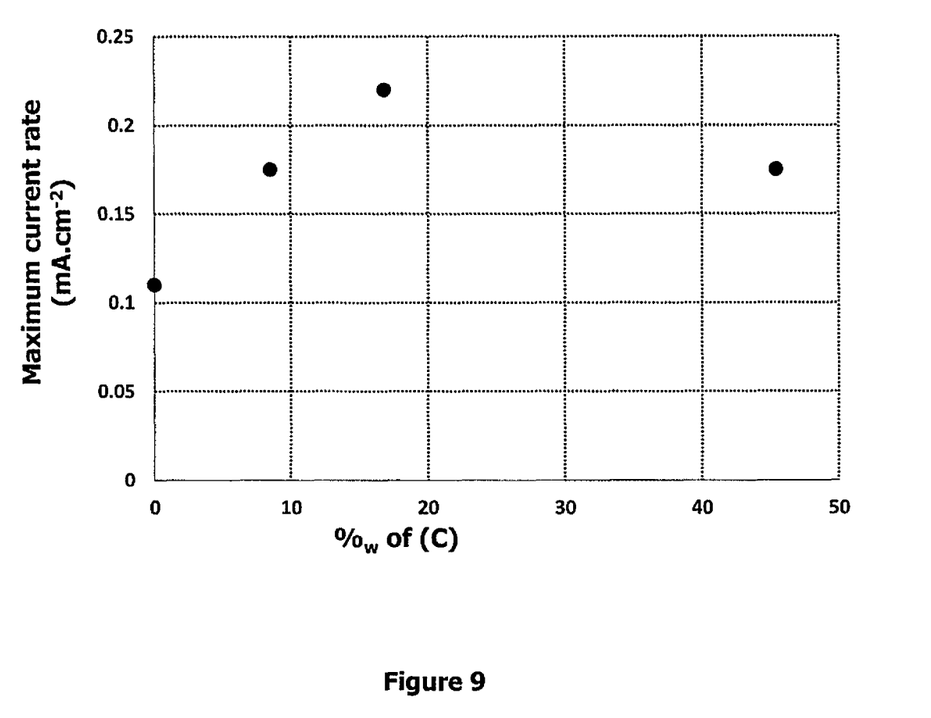
FIG. 9 shows the maximum current rate that can be used with electrolyte composition for a constant salt concentration of 0.35 mol·kg$^{-1}$. It is to be noted that the absolute current rate values given in FIG. 9 are only relevant for the specific cell configuration and components used for the test shown, the conditions fixed not being optimized as such. Here the cell component and configuration are fixed to a certain standard to demonstrate the effect of electrolyte component ratio on the current rate, the ratio of values observed being the most important result drawn from the test.

FIG. 9 shows the maximum current rate that can be used with electrolyte composition for a constant salt concentration of 0.35 mol·kg⁻¹. This graph enables the determination of the optimum amount of solvent such as DME to be added in order to reach the maximum current rate.

Figure 10:
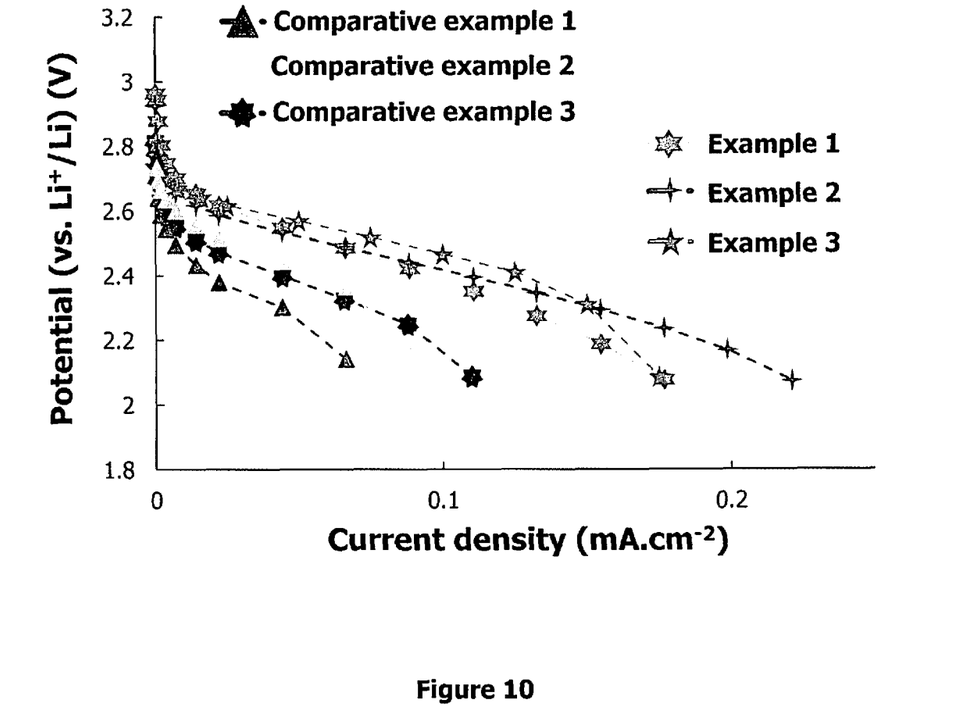
FIG. 10 shows rate test performances of Li—O$_2$ cells with different electrolytes.

FIG. 10 shows rate test performances of Li—O₂ cells with different electrolytes. The optimized composition of electrolyte in the disclosure, containing a fluorine chain attached to the cationic part of an ionic liquid, is seen to enable the Li—O₂ battery containing it to deliver higher capacity when higher current rate if applied.

Determination of Compatibility of SEHCLO with Li Anode Using Rate Performance of Li//Li Symmetrical Cells Preparation of Li//Li cells: All steps of the preparation were carried out inside an argon-filled glove box with oxygen and water concentrations below 1 ppm in order to avoid any water contamination. Cells were prepared using homemade equipment based on an open swage-lock core cell (ϕ12 mm). A Li disk (ϕ8 mm) (Rookwood, US) was placed on a stainless steel cylinder (AISI 316) used as negative current collector. Glass fiber separators (Whatmann, BE) (ϕ12 mm) were then placed at the surface of the lithium and soaked with 200 μl of electrolyte. Another Li disk (ϕ8 mm) (Rookwood, US) was placed on the top of separator covered by stainless steel cylinder (AISI 316) used as positive current collector.

Test of Li//Li cells: The cells were placed in the temperature chamber at the operating temperature (25° C.). VMP multichannel potentiostats/galvanostats (Biologic, France) controlled with EC lab software were used to apply different current rate from 0.5 10⁻³ mA·cm⁻² to 0.30 mA·cm⁻² for 15 min following the potential until the potential reached the value of −2 V.

Figure 11:
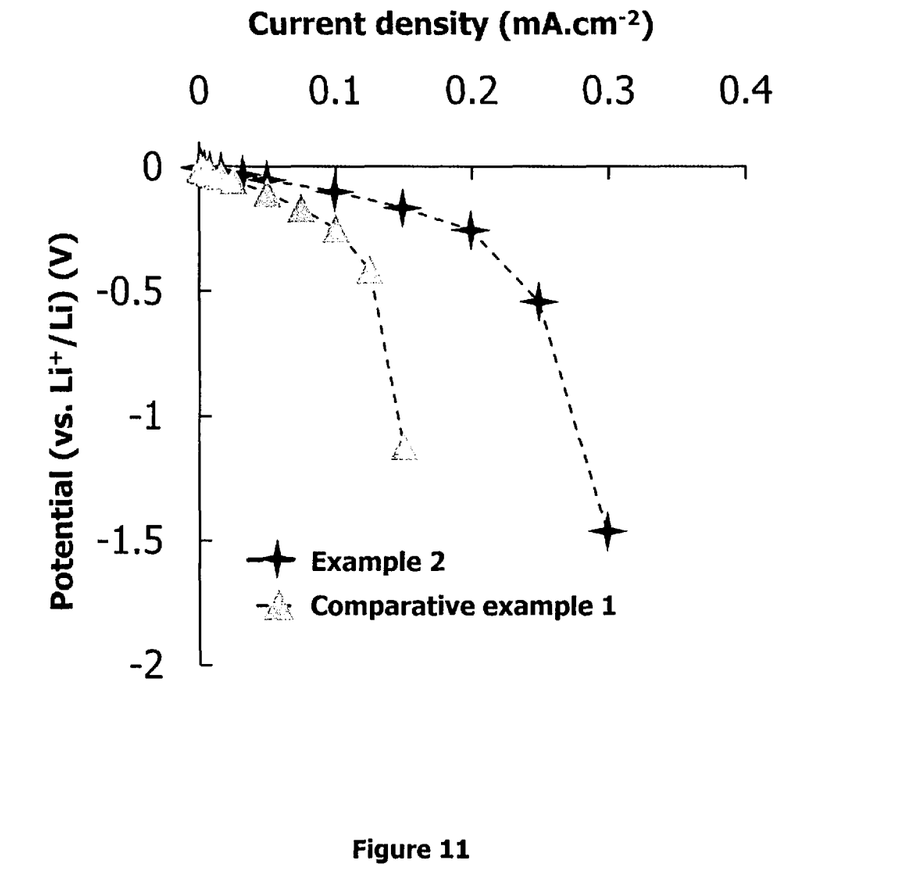
FIG. 11 shows rate test performances of Li—Li cells with different electrolytes.

FIG. 11 shows rate test performances of Li-Li cells with different electrolyte. The composition of electrolyte which allows Li metal to be stripped and plated at the current rate applied was seen to be optimized. FIG. 11 shows that compared to a classical pure ionic liquid IL (without DME), the Stable Electrolyte for High Current rate Li-Oxygen batteries (SEHCLO) shows improved performance for Li metal plating at high rate.

The invention claimed is:
1. An electrolyte composition comprising:
(A) a cation having the following structural formula (1):

$$R^1R^2R^3N^+\text{-(linker}^1\text{)-O-(linker}^2\text{)-(FC)} \quad (1)$$

wherein:
$R^1$ and $R^2$ are both C1-C6 linear or branched alkyl groups;
$R^3$ is a C1-C6 linear or branched alkyl group;
the linker¹ consists of: an alkylene chain —(CH₂)ₙ— wherein n≥1, or a chain of formula —(CH₂—O—CH₂—)ₚ wherein p≥1;
the linker² consists of an alkylene chain —(CH₂)ₘ— wherein m≥1, or a chain of formula —(CH₂—O—CH₂—)_q wherein q≥1;
the group FC is a fluorinated alkyl group of formula $C_aH_bF_c$ wherein b+c=2a+1, where c is at least 1 and at most 2a+1 and where a is at least 1 and at most 10;
(B) an anion, wherein the anion (B) is selected from the group consisting of:
dicyanamide; halides; and bis(pentafluoroethyl)trifluorophosphate;
(C) at least 8% and at most 50% by weight, with respect to 100% by weight constituted by all the components of the electrolyte composition, of a solvent, wherein the solvent is one containing at least one —O—CH₂—CH₂—O— or —O—CH₂—CHMe-O— group, an ε-caprolactone oligomer, or a dialkyl sulfoxide; and
(D) a lithium salt in an amount of at least 0.1 mol·kg⁻¹ and at most 0.9 mol·kg⁻¹ with respect to the electrolyte composition as a whole.

2. The electrolyte composition according to claim 1, wherein the solvent containing at least one —O—CH₂—CH₂—O— or —O—CH₂—CHMe-O— group shows end-capping —O-Me groups.

3. The electrolyte composition according to claim 1, wherein the solvent containing at least one —O—CH₂—CH₂—O— or —O—CH₂—CHMe-O— group has a molecular weight Mw of not more than 225 g·mol⁻¹.

4. The electrolyte composition according to claim 1, wherein the solvent containing at least one —O—CH₂—CH₂—O— or —O—CH₂—CHMe-O— group is selected from the group consisting of: dimethoxyethane (DME), diethylene glycol dimethyl ether (diglyme), triethylene glycol dimethyl ether (triglyme, TEGDME), and tetraethylene glycol dimethyl ether (tetraglyme).

5. The electrolyte composition according to claim 1, wherein the solvent containing at least one —O—CH₂—CH₂—O— or —O—CH₂—CHMe-O— group is dimethoxyethane (DME).

6. The electrolyte composition according to claim 1, wherein with respect to 100% by weight constituted by all the components of the electrolyte composition, the amount of solvent (C) is at least 13% and at most 40%.

7. The electrolyte composition according to claim 1, wherein the lithium salt (D) is selected from the group consisting of: LiTFSI, LiPF₆, LiBF₄, LiClO₄, LiFSI, LiBOB LiAsF₆, LiFAP, LiTriflate, LiDMSI, LiHPSI, LiBETI, LiDFOB, LiBFMB, LiBison, LiDCTA, LiTDI, LIPDI.

8. The electrolyte composition according to claim 1, wherein the lithium salt (D) is LiTFSI.

9. The electrolyte composition according to claim 1, wherein the lithium salt (D) is present in an amount of at least 0.25 mol·kg⁻¹ and at most 0.50 mol·kg⁻¹ with respect to the electrolyte composition as a whole.

10. The electrolyte composition according to claim 1, wherein in linker¹:
n is at most 10;
p is at most 5;
and in linker²:
m is at most 10; and
q is at most 5.

11. The electrolyte composition according to claim 1, wherein the linker group linker¹ is ethylene —CH₂—CH₂—.

12. The electrolyte composition according to claim 1, wherein the linker group linker² is methylene —CH₂—.

13. The electrolyte composition according to claim 1, wherein c>b in the fluorinated alkyl group FC.

14. The electrolyte composition according to claim 1, wherein the linker group linker¹ is ethylene —CH₂—CH₂—, the linker group linker² is methylene —CH₂—, $R^1$ and $R^2$ are ethyl and $R^3$ is methyl, and FC is CF₃.

15. The electrolyte composition according to claim 1, wherein anion (B) is: $C_nF_{2n+1}$—SO₂—N—SO₂—$C_mF_{2m+1}^-$, $C_nF_{2n+1}COO^-$ and/or $C_nF_{2n+1}SO_3^-$, wherein n and m are at least 1 and at most 10; $PF_6^-$, $BF_4^-$.

16. The electrolyte composition according to claim 1, wherein anion (B) is F₃C—SO₂—(N⁻)—SO₂—CF₃.

17. The electrolyte composition according to claim 1, wherein cation (A) and anion (B) are together N,N-diethyl-N-methyl-N-((trifluoroethoxy)ethyl)ammonium bis(trifluoromethanesulfonyl)imide:

18. A lithium-air battery comprising:
a negative electrode containing a negative-electrode active material;
a positive electrode using oxygen as a positive-electrode active material; and
an electrolyte medium arranged between the negative electrode and the positive electrode;
wherein the electrolyte medium comprises the electrolyte composition according to claim 1.

* * * * *